July 26, 1927.

F. HONIG 1,637,111

PROCESS OF MANUFACTURING DIES

Filed June 9, 1921

INVENTOR.
FRANK HONIG
BY
ATTORNEYS.

Patented July 26, 1927.

1,637,111

UNITED STATES PATENT OFFICE.

FRANK HONIG, OF OAK PARK, ILLINOIS, ASSIGNOR TO CYCLO CORPORATION, OF CHICAGO, ILLINOIS, A CORPORATION OF ILLINOIS.

PROCESS OF MANUFACTURING DIES.

Application filed June 9, 1921. Serial No. 476,115.

This invention relates particularly to dies for wire-drawing purposes and to a method of manufacturing the same. The invention is applicable, however, to dies for various purposes.

The primary object is to provide a die having greatly improved wear-resisting qualities. A further object is to provide an improved method of manufacturing dies, enabling a die of long life to be manufactured quite cheaply.

In accordance with this invention, a composite die is formed which possesses a body of great strength, preferably steel, and which possesses a wear-resisting operative portion of great hardness, the wear-resisting portion being preferably tungsten containing a small percentage of carbon the operative portion being subjected to special treatment in the process of manufacture.

The method of practicing the invention is illustrated in the accompanying drawing, in which—

Figure 1:
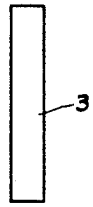
Figure 2:
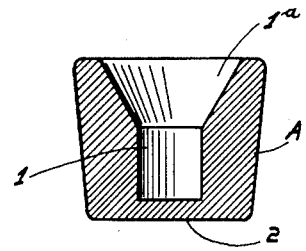
Figure 4:
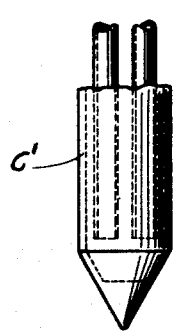
Figure 3:
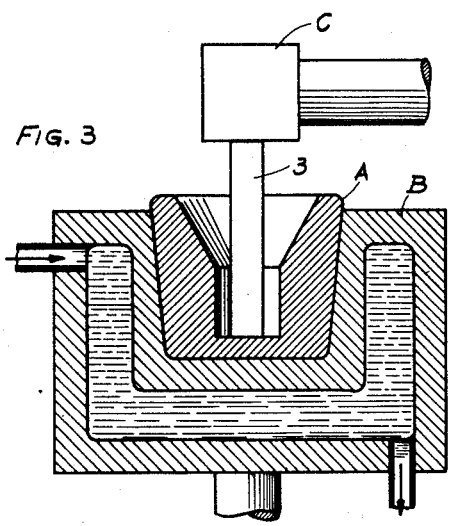
Figure 5:
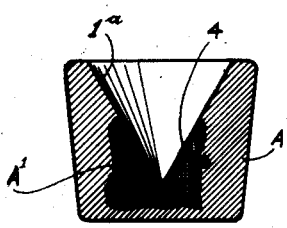

Fig. 1 represents a bar or rod of tungsten; Fig. 2, a sectional view of the steel body portion of the die; Fig. 3, a similar section showing the tungsten bar entered in the recess with which the body-portion is provided; Fig. 4, a broken view of a water-cooled tool for forming the tungsten after it has been reduced to a molten condition; Fig. 5, a sectional view of the die previous to the drilling operation; and Fig. 6, a sectional view of the finished die, the view showing brokenly a piece of rod which is being drawn into wire.

Figure 6:
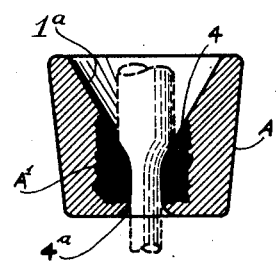

As shown in Fig. 6, the die comprises a steel body portion A containing an insert of tungsten A'.

In the preferred method of manufacture, the body A is first formed in the shape shown in Fig. 2, being in approximately cylindrical form and provided with a bore or recess 1 which has a tapered or flaring end portion 1ª at one end of the block. At the other end of the bore 1, the block has an end wall 2.

A bar of tungsten 3 is introduced into the bore 1; the body A of the die is introduced into a water-cooled cup-shaped terminal or electrode B; another electrode C is applied to the upper end of the piece of tungsten; and, by means of electric current, the tungsten bar is melted, so as to fill or partially fill the lower portion of the cup-shaped body A. After the tungsten has been melted, the water-cooled pointed tool C' is introduced and employed to cool and mold the tungsten body. During the period of solidification of the tungsten, it is subjected to pressure which is increased as the solidification progresses. If desired, either the pointed tool C' or the body of the die may be subjected to comparatively slow rotation during the period of compression. The action of cooling and compressing the tungsten has the result of preventing the formation of the ordinary characteristic crystalline agglomeration of the particles or molecules of the tungsten, and the working of the tool (involving compression with or without rotation), tends to improve the structure of the tungsten for the desired purpose. The effect of the pressure and working under these conditions is to render the tungsten more dense and hard at the inclined or conical surface 4 which is formed by the pointed tool, this being the portion of the metal which is operative in effecting the reduction of the wire as it is drawn. It may, perhaps, be more accurately said that the tungsten, containing a percentage of carbon, is melted or rendered sufficiently fluid to fill or conform to the matrix in the steel block and that by the use of the water-cooled pointed tool, applied with suitable and preferably continued pressure, the surface is chilled while the pressure is applied. Since tungsten melts at an extremely high temperature (about 3400° C., see Smithsonian Physical Tables, 1921) and carbon sublimes at about 3500° C. (idem), it is altogether probable that tungsten carbides, or carbide, are formed and that the chilling fixes these carbides at and near the chilled surface. In any event the metal at the surface is extremely hard (scratching anything except diamond), and the hardness decreases from the surface inwardly. It may be added that a small percentage of carbon; say from 1% to 3%, will suffice to give to the tungsten the desired characteristics. While it is believed that the carbon is fixed in a combined state, or as a carbide, at and near the chilled surface and is perhaps deposited and held more and more in solid solution as the depth from the surface increases, it is unnecessary to commit oneself definitely to any theory of explanation of the improved result. In any event, the carbon serves as a hardening agent, and this is particularly true at or near the chilled surface of the tungsten body.

It will be understood by those skilled in the metallurgical art that the melting of the tungsten and the operation thereon should be effected in a non-oxidizing atmosphere, as, for example, a hydrogen atmosphere. Any suitable provision may be employed to enable this to be accomplished, no special provision being here shown. The bar of tungsten may be obtained by any suitable method of manufacture, for example, tungsten trioxide may be reduced in a current of hydrogen and the tungsten powder may be melted and cast in a mold. Or, if desired, tungsten powder may be mixed with some binding material and passed thru a steel die to produce the rod. In whatever manner the tungsten may be prepared initially, it should be provided, before being used in the manufacture of dies, with a suitable carbon constituent. It is preferred to have the tungsten practically pure, but with a small carbon content, which should not exceed a few per cent.

It may be said that in the manufacture of the die, the heat of the electric current and also the heat of the molten tungsten serves to melt or soften a portion of the steel supporting body of the die; and the tungsten becomes thoroughly welded to the steel. At the junction between the tungsten and the steel, an alloy is formed. The tungsten penetrates the steel to a certain extent, and, conversely, the steel penetrates the tungsten to a certain extent. The working surface of the tungsten practically is, however, pure tungsten, containing a small percentage of carbon.

After the tungsten insert or core has been introduced in the manner described, a perforation 4ª is drilled through the center of the block, the upper end of this perforation merging with the conical surface 4 formed by the pointed tool. After the drilling operation, which cannot be performed by ordinary drilling methods, but must be accomplished by the method used in drilling diamond dies, the surface of the bore is lapped, ground or made smooth in any desired manner. The inner surface of the die is subjected to a charging operation, in which operation graphite, or other solid lubricating material, such as limestone or soapstone, is caused to fill the pores or openings in the metal at the operative surface of the die. This is effected by introducing graphite and grinding it into the pores of the surface by means of a tool hardened and ground to fit the form of the interior surface of the die. This is effected under heavy pressure, the pressure being preferably higher than the die would be exposed to when wire is drawn therethru. The high pressure serves to charge the minute openings of the tungsten or steel, as the case may be, with the solid lubricant, thus insuring an exceedingly smooth wearing surface, and an unbroken film of lubricating material at such surface. In the use of the die, additional lubricant is introduced, of course, as the wire-drawing operation proceeds. It may be added that tungsten has a great affinity for carbon, and where graphite or carbon is used as a solid lubricant during a wire-drawing operation, the die tends to keep its surface charged with a sufficient carbon content to maintain the best wearing surface.

It may be stated that if the tungsten body has been melted, and worked into virtually integral formation with the steel cup by heavy pressure, during which process the mold is chilled, as well as condensed, it possesses a structure capable, in the highest degree, of resisting wear and at the same time capable of withstanding exceedingly high pressure, it being noted that the tungsten is backed, bound or encased by the steel shell which possesses a very high tensile strength. In this connection, it may be stated that the pressures produced in wire-drawing operations sometimes reach the enormous amount of 500,000 pounds per square inch. Accordingly, the life of the ordinary steel die, or the highest grade steel alloy dies is comparatively short. The improved die possesses the requisite strength, increased hardness and superior wear-resisting properties.

While it is preferred to make the working surface of the die of tungsten, it may be stated that steel, or suitable steel alloy, may itself be subjected to the improved process with highly beneficial results. For example, the die may be composed wholly of tungsten and steel, which may be reduced to a molten condition while confined in a suitable mold, and then subjected to a chilling, pressing and mechanical working operation, as by means of a pointed tool, in much the manner described. This will result in increasing the density, hardening to a certain extent, and generally improving the wear-resisting qualities of the die.

Moreover, the method of charging the wear-surface of the die with solid lubricant, such as graphite, which has been described, may be applied to ordinary dies with beneficial results. For example, steel dies may be subjected to an operation of charging the pores of their wear surfaces with a solid lubricant by pressing the lubricant into the pores under intense pressure, at the same time turning or operating the tool so as to, in effect, grind the lubricant into the pores and to some extent harden the wear surface of the die. In this manner, dies may be produced which will permit a wire-drawing operation to be performed at a speed of about fifty per cent greater than is now employed, without injury to the dies, and with prolonged life for the dies. It is quite possible that in the use of the die, enough heat is developed at the reducing point to cause a progressive formation of, or constant renewal of, a carbide surface. This may be a possible explanation of the improved wearing qualities resulting from the use of graphite as a solid lubricant ground into the pores at the wear-surface of the die, it being noted that graphite gives a markedly better result for this purpose than could be obtained from any other form of solid lubricant, such as soapstone. When the method first described herein is followed in the manufacture of the die, the efficiency of the die over the best-known dies may be even greater.

The improved process enables dies of superior quality to be produced at moderate expense; and the improved dies enable wire-drawing machines to be operated at greatly increased speeds, thereby greatly reducing the cost of production of wire. Moreover, the increased life of the die itself is an important factor in the economy of manufacture of wire.

While the invention possesses great value in connection with dies for wire-drawing purposes, it is evident that the invention may be applied to dies for other purposes. For example, a steel supporting body having a shell or wear surface of tungsten applied thereto may be produced substantially in the manner described. For some purpose, it may be desirable to produce dies for punching operations in this manner. Thus, the female die may be lined with a tungsten body and the male die may be encased in a tungsten shell, so that the operative surfaces are of tungsten while the bodies of the dies are steel, giving the necessary strength and also desirable cheapness. Any suitable metal or alloy of sufficient strength may be used as an equivalent of the steel in the supporting block.

The foregoing detailed description has been given for clearness of understanding only, and no unnecessary limitations should be understood therefrom, but the appended claims should be construed as broadly as permissible in view of the prior art.

What I regard as new, and desire to secure by Letters Patent, is—

1. The process of making a die which comprises bringing a molten body comprising tungsten and a hardening agent into contact with a supporting body of steel and welding the two together and subjecting the tungsten body to pressure during the period of solidification.

2. The process of making a die which comprises providing a steel block with a recess, forming a molten body of tungsten and a hardening agent in said recess, and subjecting the tungsten to pressure during the period of solidification.

3. The process of making a die which comprises providing a steel block with a recess, forming a molten body of tungsten and a hardening agent in said recess, and subjecting the tungsten to shaping pressure and surface chilling during the period of solidification.

4. The presure of making a die which comprises forming a cup-shaped steel block, introducing therein a bar comprising tungsten and a hardening agent, melting the bar in the bore of the cup, and subjecting the tungsten body to pressure by means of a pointed tool during the period of solidification.

5. The method of manufacturing a die which comprises forming a steel supporting body, melting a body comprising tungsten and a hardening agent in contact with said supporting body to provide a working portion, and subjecting the tungsten body to pressure and surface chilling during the period of solidification of said body and a substantial portion of the period of cooling thereof.

6. The method of forming a die which comprises introducing a body comprising tungsten and carbon into a cup-shaped steel body, introducing the steel body into an artificially cooled electrode, applying an electrode to the tungsten body, melting the tungsten body by means of an electric current passed through the electrodes and the intervening tungsten body, and subjecting the tungsten body to pressure during the period of solidification.

7. The method of making a die for wire-drawing purposes which comprises providing a steel block with a bore having a tapered orifice at one end of the block, the other end of the block presenting a closed wall, introducing a bar comprising tungsten and a hardening agent into said bore, melting the tungsten body in situ, subjecting the tungsten body to the consolidating action of a pointed tool during the period of solidification, and then boring a hole through the tungsten body and the bottom of the steel block.

8. The method of making a die for wire-drawing purposes which comprises providing a steel block with a bore having a tapered orifice at one end of the block, the other end of the block presenting a closed wall, introducing a tungsten bar into said bore, melting the tungsten bar in situ, subjecting the tungsten to pressure by a pointed tool during the period of solidification, thus producing a conical recess in the tungsten and condensing and hardening the tungsten, then boring a hole through the tungsten and the bottom of the steel cup, and then charging the working surface of the tungsten with a solid lubricant.

9. The process of making a die which comprises melting a body of tungsten containing a small percentage by weight of carbon in contact with a steel body, and consolidating the tungsten body and the steel body under pressure accompanied by a surface chilling of the tungsten body.

10. The process of making a die which comprises providing a steel block with a recess, reducing to molten condition in said recess tungsten containing a small percentage by weight of carbon, and subjecting the tungsten body to pressure and cooling while consolidating the tungsten and steel bodies into integral formation.

11. The process of making a die which comprises welding and press-forming a molten body comprising tungsten and a hardening agent onto a steel supporting base and subjecting the tungsten body to a working operation during the cooling period.

12. The process of making a die which comprises welding and press-forming a molten tungsten body containing a small percentage by weight of carbon onto a steel body, consolidating said bodies under pressure accompanied by surface chilling of the tungsten body, and working the tungsten body before it has completely solidified.

13. In the manufacture of an apertured die, the method which comprises subjecting tungsten and carbon to a temperature near the subliming temperature of carbon, until the tungsten is substantially molten, press-forming the body so as to provide a converging cavity adapted to afford a wear-surface, and then drilling a hole at the central portion of said cavity while substantially preserving the surrounding pressed surface as a wear-surface.

14. In the manufacture of an apertured die, the method which comprises subjecting tungsten and carbon to a temperature near the subliming temperature of carbon until the tungsten is substantially molten, press-forming the body so as to provide a converging cavity adapted to afford a wear-surface and simultaneously chilling said surface, and then drilling a hole at the central portion of said cavity while substantially preserving the surrounding pressed surface as a wear-surface.

15. In the manufacture of an apertured die, the process which comprises introducing into a supporting metal body provided with a bore and a bottom wall a body comprising tungsten and a small percentage by weight of carbon, subjecting the introduced body to a temperature near the subliming temperature of carbon until the tungsten is substantially molten, press-forming the tungsten body so as to provide a converging cavity adapted to afford a wear-surface, and then drilling a hole at the central portion of said cavity while substantially preserving the surrounding pressed surface as a wear-surface.

16. In the manufacture of an apertured die, the steps which comprise introducing into a cup-shaped metal-supporting member a body comprising tungsten and a small percentage by weight of carbon, melting the tungsten in situ, and subjecting the introduced body to shaping and working under pressure in the cooling period.

17. In the manufacture of an apertured die, the steps which comprise introducing into a cup-shaped metal-supporting member a body comprising tungsten and a small percentage by weight of carbon, melting the tungsten in situ, and subjecting the introduced body to shaping and working accompanied by surface chilling before complete solidification has occurred.

18. In the manufacture of an apertured die, the steps which comprise subjecting a molten body of tungsten containing a small percentage by weight of carbon to the working and cooling action of a cooled pointed tool.

19. In the manufacture of a die, the method which comprises reducing to substantially molten condition within a confining wall a tungsten body containing a hardening agent, and forming and simultaneously cooling the surface of said body during the period of solidification.

20. In the manufacture of a die, the method which comprises reducing to substantially molten condition a tungsten body containing a hardening agent and forming said body under pressure accompanied by working and simultaneously chilling the surface of the body.

21. In the manufacture of a die, the method which comprises reducing to substantially molten condition, a tungsten body associated with a hardening agent, forming said body and simultaneously chilling a surface thereof, and subsequently grinding carbonaceous material into the pores of the wear-surface of the die.

22. The process of producing a die which comprises subjecting the wear-surface of the die to pressure and mechanical working, with a solid lubricant interposed between the wear-surface and the working tool, whereby solid lubricant is caused to charge the pores of the wear-surface of the die.

23. The process of producing a die which comprises grinding into the wear-surface of the die a solid lubricant by introducing such lubricant between said wear-surface and tool and causing a relative rotation of said parts while the parts are maintained under heavy pressure.

FRANK HONIG.